US011893560B1

(12) United States Patent
Christensen

(10) Patent No.: US 11,893,560 B1
(45) Date of Patent: Feb. 6, 2024

(54) SYSTEMS AND METHODS FOR CLOUD-BASED MANAGEMENT OF PAYMENT DEVICES

(71) Applicant: Worldpay, LLC, Symmes Township, OH (US)

(72) Inventor: Coy Christensen, Scottsdale, AZ (US)

(73) Assignee: Worldpay, LLC, Symmes Township, OH (US)

( * ) Notice: Subject to any disclaimer, the term of this patent is extended or adjusted under 35 U.S.C. 154(b) by 80 days.

(21) Appl. No.: 16/822,847

(22) Filed: Mar. 18, 2020

Related U.S. Application Data

(63) Continuation of application No. 15/354,075, filed on Nov. 17, 2016, now Pat. No. 11,488,130.

(51) Int. Cl.
*G06Q 20/20* (2012.01)
*H04L 67/10* (2022.01)
*G06Q 20/40* (2012.01)

(52) U.S. Cl.
CPC ........... *G06Q 20/202* (2013.01); *G06Q 20/40* (2013.01); *H04L 67/10* (2013.01)

(58) Field of Classification Search
CPC ........ H04W 12/06; G06F 9/466; G06F 21/32; G06F 20/30; G06Q 20/401; G06Q 20/4097; G06Q 20/202; G06Q 20/40; G06Q 20/10; G06Q 20/20; G06Q 30/0238; G06Q 30/0268; H04M 15/8242; H04M 2215/7846; Y10S 902/22; Y10S 902/40; H04L 67/10; H04L 63/0861; H04L 2463/082; G07G 1/0036; G07G 1/01;

(Continued)

(56) References Cited

U.S. PATENT DOCUMENTS

| 7,472,394 B1 | 12/2008 | Meckenstock et al. |
| 2004/0133474 A1* | 7/2004 | Tami ..................... G06Q 30/02 705/16 |

(Continued)

FOREIGN PATENT DOCUMENTS

JP        6007346 B1 * 10/2016

*Primary Examiner* — Fahd A Obeid
*Assistant Examiner* — Avia Salman
(74) *Attorney, Agent, or Firm* — Bookoff McAndrews, PLLC

(57) ABSTRACT

A computer-implemented method for cloud-based management of payment devices includes connecting a point of interaction device (POI) to a terminal management engine (TME) through a computer network, downloading operating software for the POI and configuration files for the POI from the TME to the POI, initializing the POI using the operating software, and configuring the POI using the configuration files. An alternative computer-implemented includes connecting to a POI through a computer network, receiving a transaction request from a TMC through the computer network, confirming access to the POI, transmitting a request for consumer information to the POI, receiving requested consumer information from the POI, transmitting the requested consumer information to the TMC, receiving a transaction approval message or a transaction decline message from the TMC, and transmitting the transaction approval message or the transaction decline message to the POI.

16 Claims, 6 Drawing Sheets

(58) Field of Classification Search
CPC ....... G07G 1/0009; G07B 2017/00225; G03G 15/5091; H04N 21/6334
See application file for complete search history.

(56) References Cited

U.S. PATENT DOCUMENTS

| | | | |
|---|---|---|---|
| 2009/0145958 A1* | 6/2009 | Stoutenburg | G07G 1/12 235/383 |
| 2014/0279474 A1* | 9/2014 | Evans | G06Q 20/40 705/41 |
| 2015/0178730 A1* | 6/2015 | Gleeson | G06Q 20/3829 705/72 |
| 2015/0199667 A1* | 7/2015 | Fernando | G06Q 20/202 705/21 |
| 2016/0224774 A1* | 8/2016 | Pender | G06Q 20/10 |
| 2016/0300159 A1* | 10/2016 | Steinmayr | G06Q 20/18 |
| 2017/0249613 A1* | 8/2017 | Yabu | G07G 1/0045 |

* cited by examiner

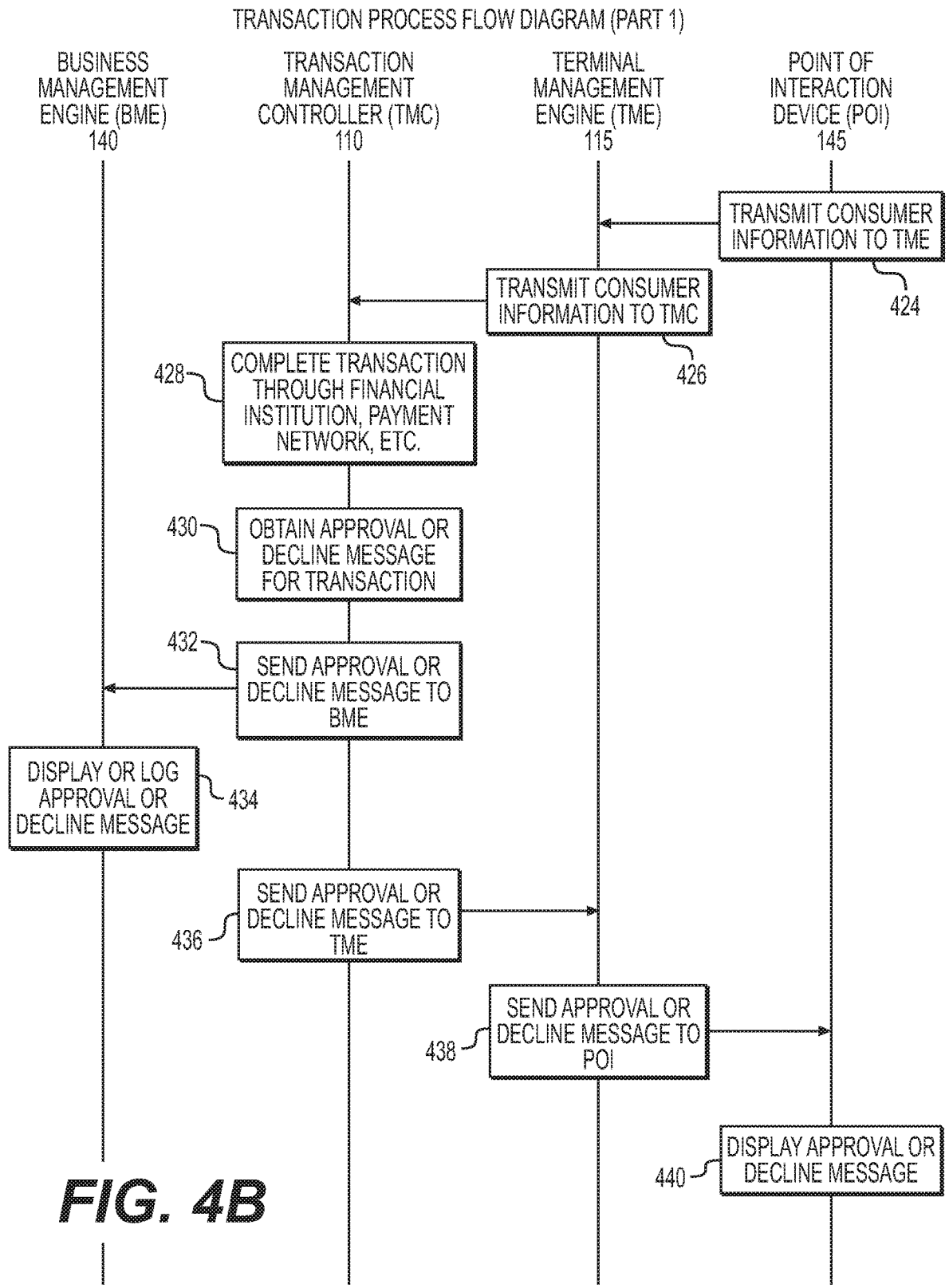

SYSTEMS AND METHODS FOR CLOUD-BASED MANAGEMENT OF PAYMENT DEVICES

CROSS-REFERENCE TO RELATED APPLICATION(S)

This patent application is a continuation of and claims the benefit of priority to U.S. patent application Ser. No. 15/354,075, filed on Nov. 17, 2016, the entirety of which is incorporated herein by reference.

TECHNICAL FIELD

The present disclosure relates generally to the field of payment transactions and, more particularly, to the configuration and management of point of interaction devices (POIs) used for such transactions.

BACKGROUND

Merchants and other store owners have point of sale (POS) terminals and POS systems that can accept check or payment card payments from consumers for goods and services. Such environments typically include devices, such as card readers and PIN pads, used to collect payment information from the consumer. Such devices are also known as "point of interaction" devices (POIs). A merchant may have a single POI or may have multiple POIs, possibly distributed across multiple locations. Merchants, thus, may be required to install, manage, and configure multiple POIs. These tasks may include installing operating software on each POI, configuring the POI to accept payments to submit to outside payment processors, and permitting such outside payment processors to access the merchant's internal networks. Such access may be complicated by the merchant's existing IT infrastructure, including firewalls and other IT security measures.

Even after the POI has been installed, the merchant faces challenges in maintaining and managing the POI. A given POI device must be confirmed as being certified for interaction with an outside payment processor. A POI may fail and, thus, be offline and unavailable for processing payments, but such failures may be silent and not detected immediately. These challenges may be exacerbated when the merchant has a large number of POIs spread across multiple locations.

Accordingly, there is a need for processes and systems to reduce the complexity and costs of installing, configuring, and managing the POIs that process check or payment card payments for a merchant.

SUMMARY

According to certain aspects of the present disclosure, systems and methods are disclosed for automatically installing and configuring a point of interaction device (POI) for processing consumer payments within a merchant environment.

In one embodiment, a computer-implemented method is disclosed for cloud-based management of payment devices. The method includes: connecting a point of interaction device (POI) to a terminal management engine (TME) through a computer network; downloading operating software for the POI and configuration files for the POI from the TME to the POI through the computer network; initializing the POI using the downloaded operating software; and configuring the POI using the downloaded configuration files.

In an alternative embodiment, a computer-implemented method is disclosed for cloud-based management of payment devices. The method includes: receiving a connection from a point of interaction device (POI) at a terminal management engine (TME) through a computer network; transmitting operating software for the POI and configuration files for the POI from the TME to the POI through the computer network; transmitting instructions to the POI for initializing the POI using the downloaded operating software through the computer network; and transmitting instructions to the POI for configuring the POI using the downloaded configuration files through the computer network.

In a further embodiment, a computer-implemented method is disclosed for cloud-based management of payment devices. The method includes: connecting to a point of interaction device (POI) through a computer network; receiving a transaction request from a transaction management controller (TMC) through the computer network; confirming access to the POI; transmitting a request for consumer information to the POI; receiving requested consumer information from the POI; transmitting the requested consumer information to the TMC; receiving a transaction approval message or a transaction decline message from the TMC; and transmitting the transaction approval message or the transaction decline message to the POI.

In accordance with another embodiment, a system is disclosed for cloud-based management of payment devices. The system comprises: a memory having processor-readable instructions stored therein; and a processor configured to access the memory and execute the processor-readable instructions, which when executed by the processor configures the processor to perform a plurality of functions, including functions to: connect to a point of interaction device (POI) through a computer network; receive a transaction request from a transaction management controller (TMC) through the computer network; confirm access to the POI; transmit a request for consumer information to the POI; receive requested consumer information from the POI; transmit the requested consumer information to the TMC; receive a transaction approval message or a transaction decline message from the TMC; and transmit the transaction approval message or the transaction decline message to the POI.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIGS. 4A and 4B depict a process flow diagram of an example method of processing consumer payments within a merchant environment, according to one or more embodiments.

DETAILED DESCRIPTION

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for installing and managing point of interaction devices within a merchant environment.

As described above, a merchant may encounter high complexity and high costs of installing, configuring, and managing the point of interaction devices (POIs) that process check or payment card payments for the merchant. Thus, the embodiments of the present disclosure are directed to improving (i.e., reducing) the complexity and cost of such an implementation by providing automatic installation and configuration of POIs. Furthermore, embodiments may provide for centralized management of POIs.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, or any other like financial transaction instrument.

Overview

Figure 1:
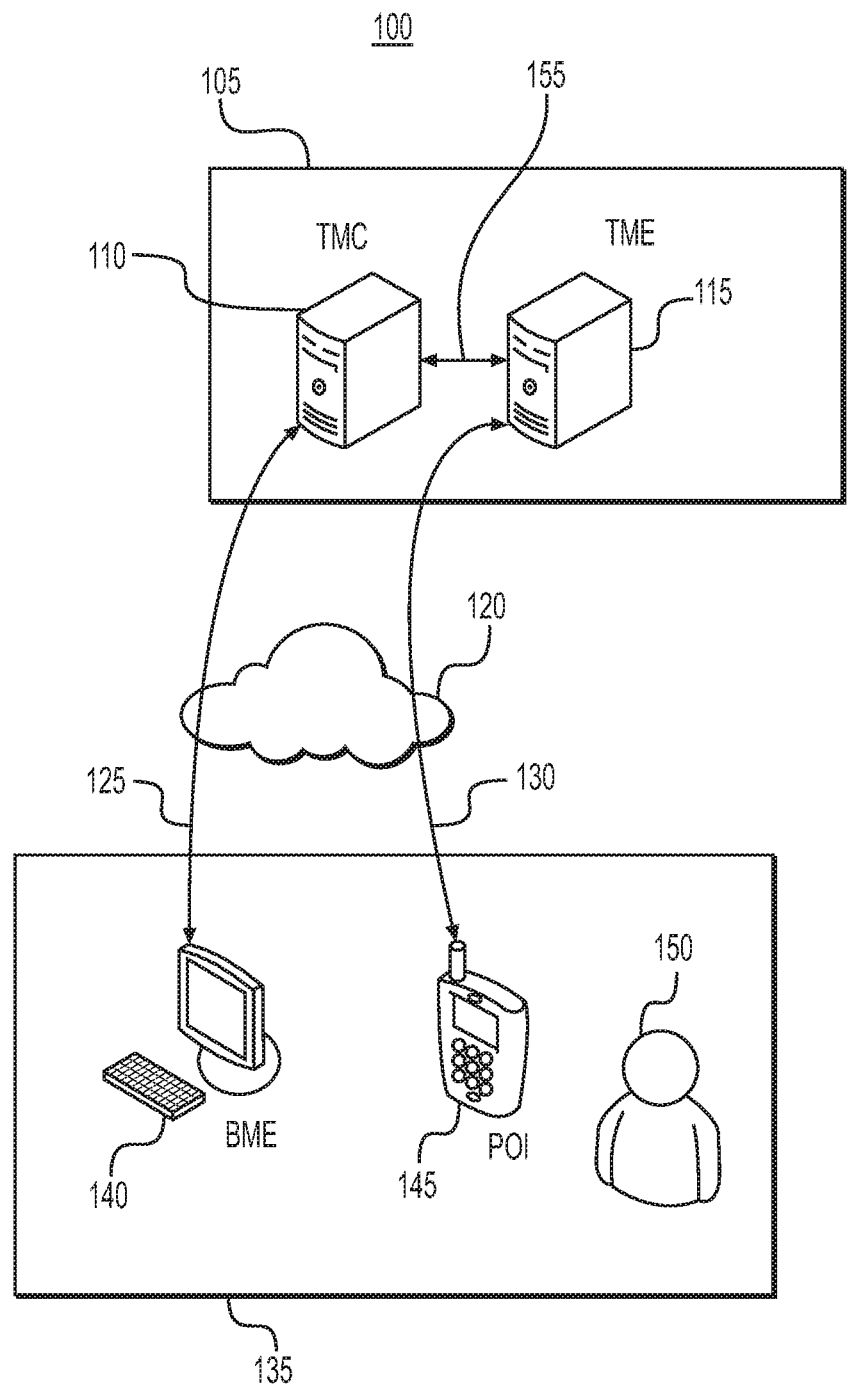
FIG. 1 depicts a merchant environment for processing consumer payments, according to one or more embodiments.

Referring now to FIG. 1, in one or more embodiments, a system 100 is disclosed for managing payment authorization request messaging for payment transactions. System 100 may include a payment processing system 105 and one or more merchant locations 135. Payment processing system 105 and merchant location 135 may be connected by computers networks, such as first network connection 125, second network connection 130 and/or cloud 120. Payment processing system 105 may include a transaction management controller (TMC) 110 and a terminal management engine (TME) 115, which may be connected by network connection 155. Merchant location 135 may include a business management engine (BME) 140 and a point of interaction (POI) device 145. POI 145 may provide a user interface, such as a pin pad, keyboard, touch screen, or other suitable user interaction device, to allow interaction of a user 150 with POI 145. BME 140 may be connected to TMC 110 by way of a first computer network connection 125. In one or more embodiments, POI device 145 may be communicatively isolated from BME 140. Multiple POIs 145 may be installed at multiple locations for a single merchant. Each of the installed POIs 145 for the merchant may be accessed through a single TME 115.

At the time of installation of a POI 145, a connection between POI 145 and TME 115 may be established by way of a second computer network connection 130. A merchant ID and a lane ID may be associated with POI 145, and POI operating software and configuration files may be established on POI 145. In one or more embodiments, POI 145 may automatically establish communication with TME 115, and TME 115 may automatically transmit the POI operating software and configuration files to POI 145. The internal structure of TME 115 will be discussed in greater detail below with respect to FIG. 2. The installation process for a POI 145 will be discussed in greater detail below with respect to FIG. 3.

In operation, TMC 110 may receive a payment request from BME 140 in connection with a payment transaction. The payment request may include a transaction amount and can be embodied as a Hypertext Transfer Protocol (HTTP) message. After receiving the payment request, TMC 110 may request a payment transaction type from POI device 145. The requested payment transaction type may correspond to the payment card or payment vehicle that is to be used for the payment transaction.

In response to receiving the requested payment transaction type from POI device 145, TMC 110 may request payment card data (e.g., a payment card number, etc.) for the payment transaction from POI device 145 (e.g., via a card reader, a PIN pad, etc.) based on the requested payment transaction type. Once the payment card data is received from POI device 145, and based upon the requested payment transaction type, TMC 110 may insert the received transaction amount and the payment card data into a payment authorization request message. The processing of a payment request by BME 140, TMC 110, TME 115 and POI 145 will be discussed in greater detail below with respect to FIGS. 4A, 4B, and 5.

Figure 2:
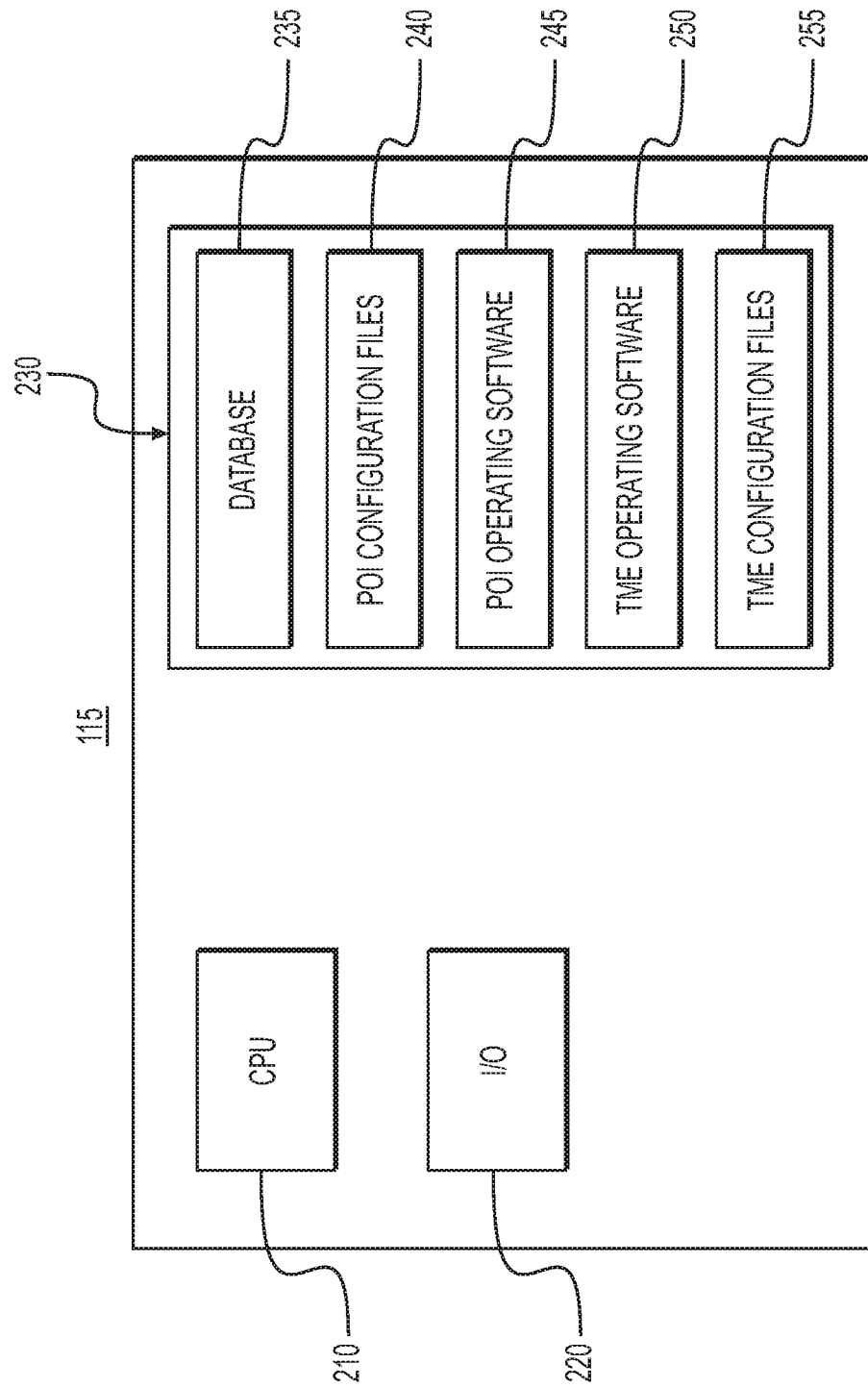
FIG. 2 depicts a block diagram of an example terminal management engine (TME) configured to manage a point of interaction device (POI), according to one or more embodiments.

FIG. 2 depicts a block diagram of a TME 115 configured to manage a POI, according to one or more embodiments. TME 115 may comprise a processor (CPU) 210 for executing TME operating software 250, a communications device 220 for communicating with TMC 110 and POI 145, and a memory 230. Memory 230 may store TME operating software 250, TME configuration files 255, POI operating software 245, and POI configuration files 240. Memory 230 may also store a database 235 that may comprise data specifying associations between a POI 145, a merchant ID, and a lane ID.

TME operating software 250 may include software files including instruction for executing operations of TME 115. TME configuration files 255 may include settings for parameters controlling the execution of TME operating software 250. POI operating software 245 may include software files including instruction for executing operations of POI 145. POI configuration files 240 may include settings for parameters controlling the execution of POI operating software 245.

The communications device 220 of TME 115 may be embodied as any type of communication circuit, device, interface, or collection thereof, configured for enabling communications between TME 115 and the TMC 110 and POI 145 via network connections 130 and 155 or via the cloud 120. For example, the communications device 220 may be embodied as one or more network interface controllers (NICs), using any one or more communication technologies (e.g., wireless or wired communications) and associated protocols (e.g., Ethernet, Wi-Fi®, WiMAX, etc.) to effect such communication.

Processor 210 may be embodied as any type of processor configured for performing the functions described herein. For example, processor 210 may be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

Memory 230 may be embodied as any type of device or devices configured for short-term or long-term storage of data such as, for example, memory devices and circuits, memory cards, hard disk drives, solid-state drives, or other data storage devices, such as magnetic disk drives, floppy drives, tape drives, hard drives, optical drives and media, magneto-optical drives and media, compact disc drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth, or flash drives, solid state hard drives, redundant array of individual disks (RAID), virtual drives, networked drives and other memory means including storage media on the processor 210. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In FIG. 1, TME 115 and TMC 110 are depicted as separate devices. However, in alternative embodiments, TME 115 and TMC 110 may be embodied as a single device comprising the components of both TME 115 and TMC 110.

Installation and Configuration of Point of Interaction Device (POI)

Figure 3:
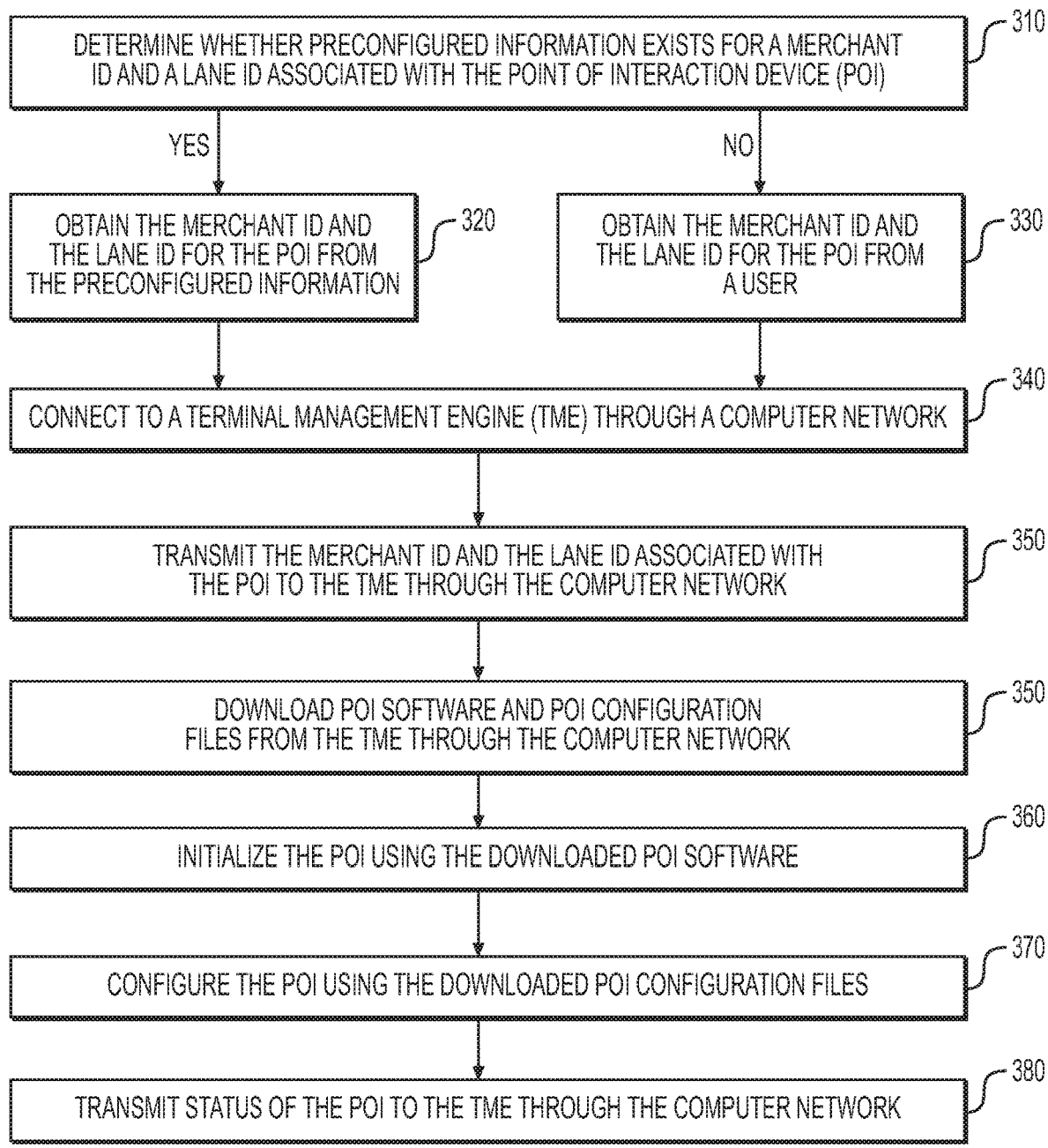
FIG. 3 is a flow chart depicting an example process for automatically installing and configuring a POI in a merchant environment, according to one or more embodiments.

FIG. 3 is a flow chart depicting an example process for automatically installing and configuring a POI 145, according to one or more embodiments. In step 310, POI 145 may determine whether preconfigured information exists for a merchant ID and a lane ID associated with POI 145. If POI 145 determines that preconfigured information exists for a merchant ID and a lane ID associated with POI 145, then at step 320, POI 145 may obtain the merchant ID and the lane ID for the POI from the preconfigured information. If POI 145 determines that no preconfigured information exists for a merchant ID and a lane ID associated with POI 145, then, at step 330, POI 145 may obtain the merchant ID and the lane ID for POI 145 from a user 150. After obtaining a merchant ID and a lane ID associated with POI 145, at step 340, POI 145 may connect to TME 115 through a computer network, such as through second network connection 130, and may, at step 350, transmit the merchant ID and the lane ID associated with POI 145 to TME 115 through the computer network. POI 145 may connect to TME 115 through a pre-configured network address or uniform resource locator (URL). At step 350, POI 145 may download POI operating software 245 and POI configuration files 240 from TME 115 through the computer network. After the POI operating software 245 and POI configuration files 240 have been downloaded from TME 115, at step 360 POI 145 may initialize using the downloaded POI operating software 245 and, at step 370, configure POI 145 using the downloaded POI configuration files 240. Upon initialization and configuration of POI 145, at step 380, POI 145 may transmit status of POI 145 to TME 115 through the computer network. The steps of downloading POI operating software 245 and POI configuration files 240 from TME 115, and initialization and configuration of POI 145 may be performed in response to commands transmitted from TME 115.

Such an automatic installation and configuration process may simplify the process of installing the POI into a simple "plug and play" method. This may reduce or eliminate the need for the merchant to install software of configuration files on POI 145 manually. Instead, the merchant may be able to only plug POI 145 into the merchant's Ethernet network, such as by the second network connection 130 and possibly answer prompts at POI 145. Such a process may allow POI 145 to make a network connection through any existing merchant firewalls or other security infrastructure, such that TME 115 does not have to obtain access to POI 145 by way of virtual private networking (VPN) or other means. Thus, by having POI 145 make a connection to TME 115 through the merchant network environment, it may not be necessary for TME 115 to understand and/or be customized to each merchant environment.

Example of POI Installation and Configuration

As an example of the installation and configuration of a POI 145, consider a merchant with two locations, each having multiple lanes and each lane including a POI 145. The merchant and/or its affiliates may operate a single TMC 110 and a single TME 115 to service all lanes, and all POIs, at both locations. The merchant may maintain an IT infrastructure that includes a firewall at each location. Because the POIs 145 at one of the locations are not at the same location as TMC 110 and TME 115, a firewall exists between the POIs 145 this location and TMC 110 and TME 115.

Now consider that the merchant wishes to install a new POI 145 at the location which is separated from TMC 110 and TME 115 by a firewall. In a merchant environment according to one or more embodiments, the merchant would begin installation of the new POI 145 by connecting the new POI 145 to the location's computer network. The new POI 145 would connect to the merchant's TME 115 by accessing a pre-configured URL. Once connected, TME 115 would transmit to POI 145 any necessary POI operating software and configuration files and initiate the configuration of POI 145. This process would be completed largely without any intervention by the merchant.

Once initialized, POI 145 would determine if an association between POI 145, a merchant ID, and a lane ID had been preconfigured. If no such association were preconfigured, POI 145 would prompt the merchant to enter a merchant ID and lane ID for POI 145. POI 145 would then transmit the associated merchant and lane ID to TME 115. This would complete the installation and configuration of POI 145 with little or no intervention by the merchant.

Payment Request Processing within Merchant Environment

Figure 4A:
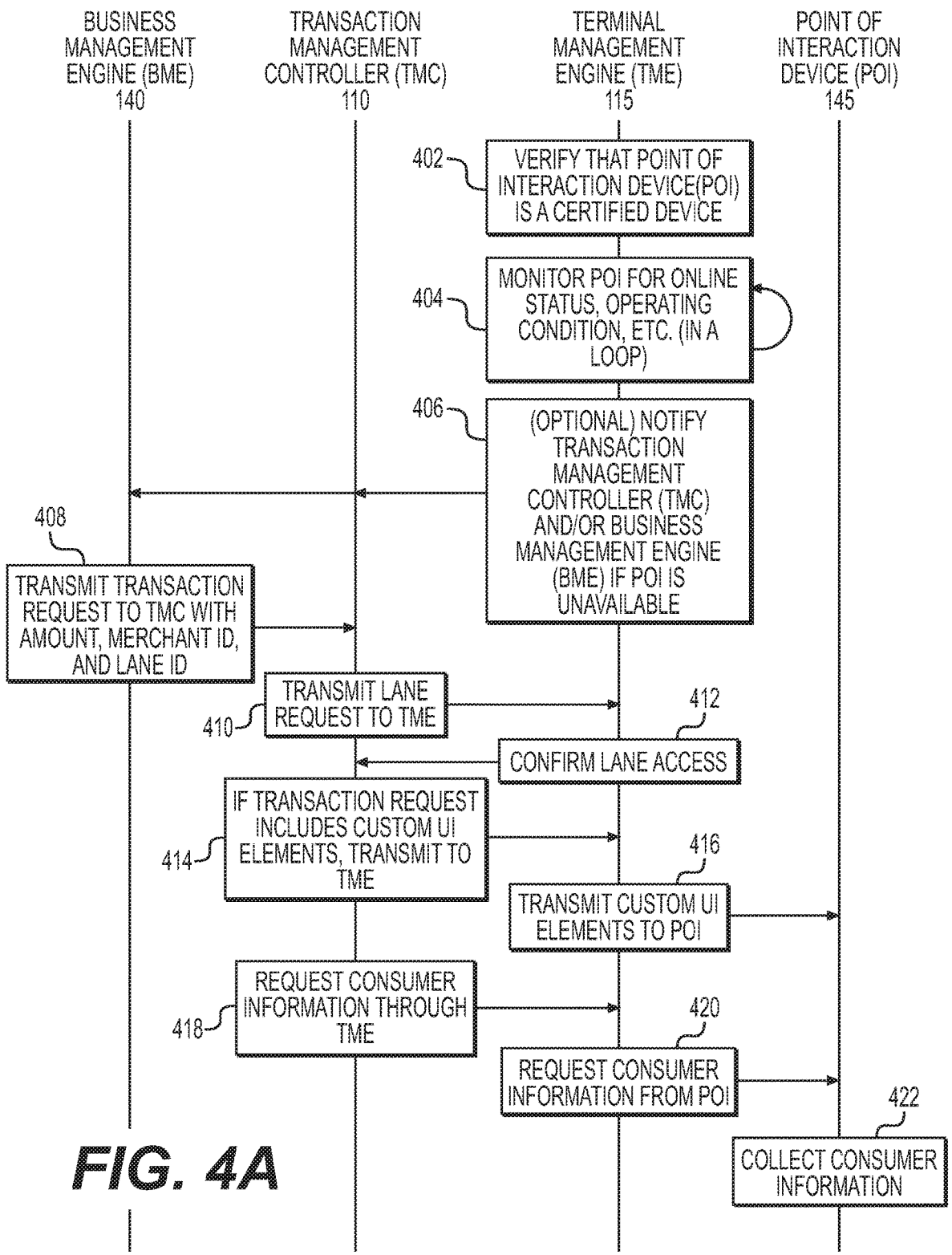

After the installation and configuration of POI 145 has been completed, BME 140, TMC 110, TME 115, and POI 145 may work together to process payment requests within the merchant environment 100. FIGS. 4A and 4B depict a process flow diagram of an example method of processing consumer payments within a merchant environment, according to one or more embodiments.

Within a merchant environment 100, TME 115 may ensure access to a POI 145. Thus, at step 402, TME 115 may verify that POI 145 is a certified device. If TME 115 cannot verify that POI 145 is a certified device then access to POI 145 may be disabled. At step 404, TME 115 may, in a loop, monitor POI 145 for online status, operating condition, etc., and at step 406, optionally notify TMC 110 and/or BME 140 if POI 145 is unavailable.

When a customer transaction request is ready to be submitted for processing, BME 140 may request that the transaction request be processed using a particular lane within the merchant environment. To do so, at step 408, BME 140 may transmit a transaction request to TMC 110 with an amount, a merchant ID, and a lane ID. The merchant ID may uniquely identify the merchant, and the lane ID may identify a lane within the merchant environment. The merchant environment may include multiple lanes, each with a separate POI 145. The lanes within a merchant environment may be at a single merchant location or may be distributed across multiple locations for the merchant. A merchant environment may have a single TME 115 or may have multiple TMEs 115, any of which may be configured to access any POI 145 within the merchant environment. However, each TME 115 may have access to POIs 145 across multiple merchants. Because TMC 110 and TME 115 may be accessed through cloud 120, the configuration of TMC 110 and TME 115 may be flexible and dynamic, and may be easily adapted to a changing merchant environment. Also, by allowing each TME 115 to access any POI 145 within the merchant environment, the merchant environment may be scaled up or down, possibly without additional configuration of the TMC 110 or BME 140. At step 410, TMC 110 may transmit a lane request to TME 115. At step 412, TME 115 may confirm that the requested lane identified by the lane ID is accessible. A transaction request may include custom UI elements to be presented to the consumer 150. Such custom UI elements drive semi-custom or custom screen flows on POI 145. At step 414, If the transaction request includes custom UI elements, TMC 110 may transmit custom UI elements to TME 115. At step 416, TME 115 may transmit the custom UI elements to POI 145.

In one or more embodiments, the custom UI elements may include specific content that may be ancillary to the customer transaction request. Such specific content may include content that may or may not be acted upon by consumer 150. For example, the specific content may include advertisements, contracts or other disclosures to consumer 150, requests for a signature from consumer 150 not specifically related to the customer transaction request, such as a concurrently or previously displayed contract, etc., a survey to be answered by consumer, brief entertainment in the form of text, still pictures, moving pictures, animations, etc., or the like.

Completion of a transaction may require consumer information, which may be obtained through POI 145. The consumer information may include data obtained by reading a consumer payment card at POI 145, a personal identification number (PIN) entered by consumer 150 at POI 145 such as on a keypad, a biometric reader (e.g., for identification information, such as fingerprints, etc.), or any other consumer information such as may be required to complete the transaction. At step 418, TMC 110 may request consumer information through TME 115. At step 420, TME 115 may request consumer information from POI 145. At step 422, POI 145 may collect consumer information, and at step 424, and POI 145 may transmit consumer information to TME 115. At step 426, TME 115 may transmit consumer information to TMC 110.

Once consumer information has been collected by POI 145 and transmitted to TMC 110, at step 428, TMC 110 may complete the requested transaction through a financial institution, payment network, etc. At step 430, TMC 110 may obtain an approval or decline message for the requested transaction. At step 432, TMC 110 may send the approval or decline message to BME 140. At step 434, BME 140 may display or log the approval or decline message. At step 436, TMC 110 may send the approval or decline message to TME 115. At step 438, TME 115 may send the approval or decline message to POI 145. At step 440, POI 145 may display the approval or decline message.

Figure 5:
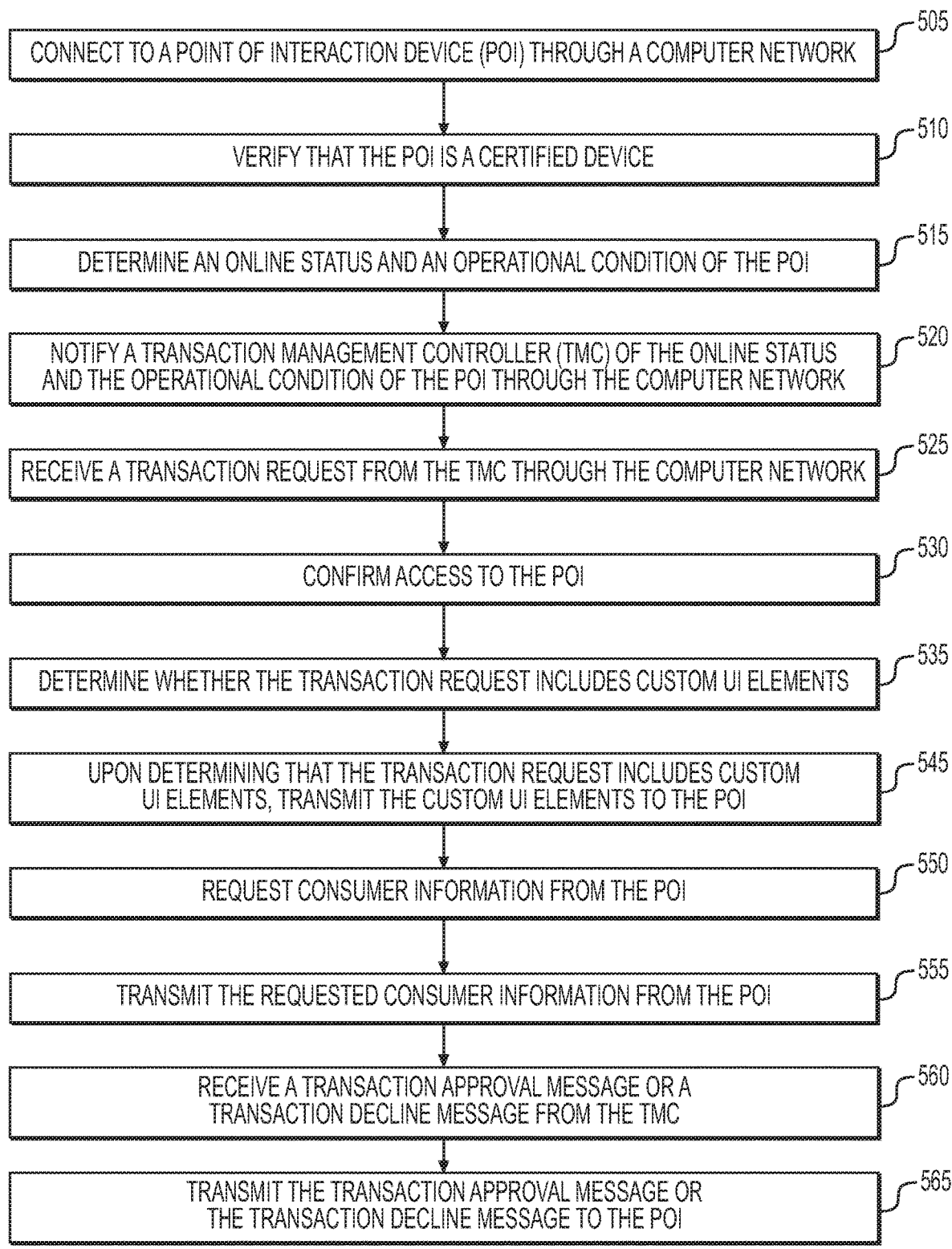
FIG. 5 is a flow chart depicting an example process for processing consumer payments within a merchant environment, according to one or more embodiments.

As a further illustration of a method of processing consumer payments, FIG. 5 is a flow chart depicting an example process for processing consumer payments within a merchant environment, according to one or more embodiments.

At step 505, TME 115 may connect to a POI 145 through a computer network. Such a connection may be established by POI 145 initiating a connection to TME 115 through a pre-configured network address or uniform resource locator (URL) stored on POI 145. At step 510, TME 115 may verify that POI 145 is a certified device. If TME 115 cannot verify that POI 145 is a certified device then access to POI 145 may be disabled. At step 515, TME 115 may determine an online status and an operational condition of POI 145. At step 520, TME 115 may notify TMC 110 of the online status and the operational condition of POI 145 through the computer network. At step 525, TME 115 may receive a transaction request from TMC through the computer network. The transaction request may include a merchant ID and lane ID corresponding to a POI 145 within the merchant environment. At step 530, TME 115 may confirm access to the POI 145. If POI 145 corresponding to the specified merchant ID and lane ID is not available, then the transaction may be cancelled with an error or the transaction may be routed to an alternative POI 145 within the merchant environment. At step 535, TME 115 may determine whether the transaction request includes custom UI elements. Such custom UI elements drive semi-custom or custom screen flows on POI 145. At step 545, TME 115 may, upon determining that the transaction request includes custom UI elements, transmit the custom UI elements to the POI. At step 550, TME 115 may request consumer information from the POI. The consumer information may include data obtained by reading a consumer payment card at POI 145; a personal identification number (PIN) entered by the consumer 150 at POI 145, such as on a keypad; biometric identification information, such as fingerprints, etc.; or any other consumer information such as may be required to complete the transaction. At step 555, TME 115 may transmit the requested consumer information to TMC. At step 560, TME 115 may receive a transaction approval message or a transaction decline message from TMC. At step 565, TME 115 may transmit the transaction approval message or the transaction decline message to the POI.

Example of Payment Request Processing

As an example of payment request processing within a merchant environment, consider a merchant completing a customer transaction. Traditionally, a POI device at the merchant location would obtain customer payment data and connect to a payment network to process the payment. However, such a process may not account for verification that a POI device is certified, monitoring the POI device to detect a failure or other unavailability of the POI device, or management access to multiple POI devices, possibly across multiple merchant locations.

In contrast, when processing payment requests in a merchant environment according to the one or more embodiments discussed above, TME 115 provides verification of the certification and current availability of a particular POI 145. Thus, the merchant may be assured that POI 145 may be used to accept customer payment information. Furthermore, because TME 115 may access and monitor multiple POIs 145 across multiple merchant locations, TME 115 may allow routing of payment requests to an alternative POI 145 if the requested POI 145 is unavailable. In addition, because access to TME 115 from a merchant location may be cloud-based (120), TME 115 may provide a scalable solution for adding, removing, or monitoring POIs 145 across multiple locations.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method of cloud-based management of payment devices, the method comprising:
    receiving a connection to a terminal management engine (TME) from a point of interaction device (POI) based on a preconfigured uniform resource locator (URL) stored in the POI or based on a preconfigured network address stored in the POI;
    determining if preconfigured information of a merchant ID associated with the POI and a merchant-specific lane identifier (lane ID) associated with the POI is set on the TME;
    upon determining that preconfigured information of the merchant ID associated with the POI and the merchant-specific lane ID associated with the POI is set on the TME, transmitting, to the POI, the merchant ID for the POI and the merchant-specific lane ID for the POI based on the preconfigured information;
    upon determining that the preconfigured information of the merchant ID associated with the POI and the merchant-specific lane ID associated with the POI is not set on the TME, receiving, from the POI, the merchant ID for the POI and the lane ID for the POI through a computer network;
    receiving a transaction request from a transaction management controller (TMC) through a computer network, the transaction request including the merchant-specific lane ID and instructions to process the transaction request with the POI associated with the merchant-specific lane ID;
    confirming access to the POI associated with the merchant-specific lane ID;
    determining whether the transaction request includes custom UI elements including one or more of: a display offering, a survey prompt, and electronic entertainment content;
    upon determining that the transaction request includes custom UI elements ancillary to the transaction request, transmitting the custom UI elements to the POI;
    transmitting a request for consumer information to the POI;
    receiving requested consumer information from the POI;
    transmitting the requested consumer information to the TMC;
    receiving a transaction approval message or a transaction decline message from the TMC; and
    transmitting the transaction approval message or the transaction decline message to the POI.

2. The method of claim 1, further comprising verifying that the POI is a certified device.

3. The method of claim 1, further comprising determining an online status and an operational condition of the POI.

4. The method of claim 3, wherein the determining of the online status and the operational condition of the POI is repeated until a transaction request is received.

5. The method of claim 3, further comprising notifying the TMC of the online status and the operational condition of the POI through the computer network.

6. A computer system for cloud-based management of payment devices, the system comprising:
    a memory having processor-readable instructions stored therein; and
    a processor configured to access the memory and execute the processor-readable instructions, which when executed by the processor configures the processor to perform a plurality of functions, including functions to:
        receiving a connection to a terminal management engine (TME) from a point of interaction device (POI) based on a preconfigured uniform resource locator (URL) stored in the POI or based on a preconfigured network address stored in the POI;
        determining if preconfigured information of a merchant ID associated with the POI and a merchant-specific lane identifier (lane ID) associated with the POI is set on the TME;
        upon determining that preconfigured information of the merchant ID associated with the POI and the merchant-specific lane ID associated with the POI is set on the TME, transmit, to the POI, the merchant ID for the POI and the merchant-specific lane ID for the POI based on the preconfigured information;
        upon determining that the preconfigured information of the merchant ID associated with the POI and the merchant-specific lane ID associated with the POI is not set on the TME, receive, from the POI, the merchant ID for the POI and the lane ID for the POI through a computer network;
        receive a transaction request from a transaction management controller (TMC) through a computer network, the transaction request including the merchant-specific lane ID and instructions to process the transaction request with the POI associated with the merchant-specific lane ID;
        confirm access to the POI associated with the merchant-specific lane ID;
        determine whether the transaction request includes custom UI elements including one or more of: a display offering, a survey prompt, and electronic entertainment content;
        upon determining that the transaction request includes custom UI elements ancillary to the transaction request, transmit the custom UI elements to the POI;
        transmit a request for consumer information to the POI;
        receive requested consumer information from the POI;
        transmit the requested consumer information to the TMC;
        receive a transaction approval message or a transaction decline message from the TMC; and
        transmit the transaction approval message or the transaction decline message to the POI.

7. The system of claim 6, wherein the plurality of functions performed by the processor when executing the processor-readable instructions further includes functions to:
    verify that the POI is a certified device.

8. The system of claim 6, wherein the plurality of functions performed by the processor when executing the processor-readable instructions further includes functions to:
    determine an online status and an operational condition of the POI.

9. The system of claim 8, wherein the determining of the online status and the operational condition of the POI is repeated until a transaction request is received.

10. A non-transitory machine-readable medium storing instructions that, when executed by a computing system, causes the computing system to perform a method for cloud-based management of payment devices, the method including:
    receiving a connection to a terminal management engine (TME) from a point of interaction device (POI) based on a preconfigured uniform resource locator (URL) stored in the POI or based on a preconfigured network address stored in the POI;

determining if preconfigured information of a merchant ID associated with the POI and a merchant-specific lane identifier (lane ID) associated with the POI is set on the TME;

upon determining that preconfigured information of the merchant ID associated with the POI and the merchant-specific lane ID associated with the POI is set on the TME, transmitting, to the POI, the merchant ID for the POI and the merchant-specific lane ID for the POI based on the preconfigured information;

upon determining that the preconfigured information of the merchant ID associated with the POI and the merchant-specific lane ID associated with the POI is not set on the TME, receiving, from the POI, the merchant ID for the POI and the lane ID for the POI through a computer network;

receiving, at the TME, a transaction request from a transaction management controller (TMC) through a computer network, the transaction request including the merchant-specific lane ID and instructions to process the transaction request with the POI associated with the merchant-specific lane ID;

confirming access to the POI associated with the merchant-specific lane ID;

determining whether the transaction request includes custom UI elements including one or more of: a display offering, a survey prompt, and electronic entertainment content;

upon determining that the transaction request includes custom UI elements ancillary to the transaction request, transmitting the custom UI elements to the POI;

transmitting a request for consumer information to the POI;

receiving requested consumer information from the POI;

transmitting the requested consumer information to the TMC;

receiving a transaction approval message or a transaction decline message from the TMC; and transmitting the transaction approval message or the transaction decline message to the POI.

11. The non-transitory machine-readable medium of claim 10, the method further comprising verifying that the POI is a certified device.

12. The non-transitory machine-readable medium of claim 10, the method further comprising determining an online status and an operational condition of the POI.

13. The non-transitory machine-readable medium of claim 12, wherein the determining of the online status and the operational condition of the POI is repeated until a transaction request is received.

14. The non-transitory machine-readable medium of claim 12, the method further comprising notifying the TMC of the online status and the operational condition of the POI through the computer network.

15. The non-transitory machine-readable medium of claim 10, the method further comprising receiving a status of the POI through the computer network.

16. The non-transitory machine-readable medium of claim 10, wherein the TME connects to the POI through a cloud-based interface.

* * * * *